United States Patent
Vannel et al.

(10) Patent No.: US 6,760,605 B1
(45) Date of Patent: Jul. 6, 2004

(54) CHIP CARD READER TELECOMMUNICATION TERMINAL

(75) Inventors: Pierre Vannel, Charbillac (FR); Henri Ohanian, Marseilles (FR)

(73) Assignee: Gemplus, Gemenos Cedex (FR)

( * ) Notice: Subject to any disclaimer, the term of this patent is extended or adjusted under 35 U.S.C. 154(b) by 0 days.

(21) Appl. No.: 09/646,510

(22) PCT Filed: Mar. 17, 1999

(86) PCT No.: PCT/FR99/00602
§ 371 (c)(1),
(2), (4) Date: Sep. 19, 2000

(87) PCT Pub. No.: WO99/49637
PCT Pub. Date: Sep. 30, 1999

(30) Foreign Application Priority Data

Mar. 20, 1998 (FR) ............................................. 98 03484

(51) Int. Cl.[7] .............................. H04B 1/38; H04M 1/00
(52) U.S. Cl. ..................... 455/588; 455/557; 455/556.1
(58) Field of Search ................................ 455/558, 557, 455/406, 408, 556, 407, 550.1, 422, 412.1, 514; 379/114.14, 114.19; 710/301; 340/825.72; 235/375, 380, 492, 406; 709/217

(56) References Cited

U.S. PATENT DOCUMENTS

| 5,465,401 A | | 11/1995 | Thompson | |
|---|---|---|---|---|
| 5,809,243 A | * | 9/1998 | Rostoker et al. | ............ 709/217 |
| 5,850,599 A | * | 12/1998 | Seiderman | ................... 455/406 |
| 5,887,266 A | * | 3/1999 | Heinonen et al. | ............ 455/558 |
| 6,078,806 A | * | 6/2000 | Heinonen et al. | ............ 455/406 |
| 6,092,133 A | * | 7/2000 | Erola et al. | .................. 710/301 |
| 6,097,967 A | * | 8/2000 | Hubbe et al. | ................. 455/558 |
| 6,141,564 A | * | 10/2000 | Bruner et al. | ................. 455/558 |
| 6,418,326 B1 | * | 7/2002 | Heinonen et al. | ............ 455/558 |
| 6,557,753 B1 | * | 5/2003 | Beaujard et al. | ............. 235/375 |

FOREIGN PATENT DOCUMENTS

| EP | 0733992 A2 | 9/1996 | |
|---|---|---|---|
| EP | 0820178 | 1/1998 | |
| FR | 2748834 | 11/1997 | |
| GB | 2296801 | 7/1996 | |
| WO | WO95/04328 | 2/1995 | |
| WO | WO96/25828 | 8/1996 | |
| WO | WO 9705729 A1 * | 2/1997 | ............ H04M/1/02 |
| WO | WO98/33343 | 7/1998 | |

* cited by examiner

*Primary Examiner*—Charles Appiah
*Assistant Examiner*—Nghi H Ly
(74) *Attorney, Agent, or Firm*—Burns, Doane, Swecker & Mathis, L.L.P.

(57) ABSTRACT

The invention concerns a telecommunication terminal (2) comprising means to be accessed by a telecommunication network and means to be accessed by a micro-computer type processing unit (1), said terminal comprising a chip card (3) for implementing at least one application and logic means (I) for the card to be accessed by the network, said terminal further comprising logic means (I) to access the card (3) from the microcomputer (1) and means for managing (20) accesses coming from the telecommunication network and/or the microcomputer.

13 Claims, 3 Drawing Sheets

CHIP CARD READER TELECOMMUNICATION TERMINAL

This disclosure is based upon, and claims priority from French Patent Application No. 98/03484, filed Mar. 20, 1998, and International Application No. PCT/FR99/00602, filed Mar. 17, 1999, the contents of which are incorporated herein by reference.

BACKGROUND OF THE INVENTION

The invention relates to a telecommunication terminal provided with an integrated circuit card known as a smart card comprising one or more application programs.

The invention applies particularly to cellular telephone terminals of the mobile terminal type such as mobile telephones complying with the GSM or DCS standards.

It should be stated that the smart cards used in telephone terminals make it possible to identify the subscriber and contain a telephone application program. These cards are generally known as SIM (Subscriber Identity Module) cards.

New generations of telephone terminals are being provided, functioning with two smart cards, one smart card dedicated to telephony and another smart card dedicated to other applications, for example the electronic purse application.

For this purpose these terminals must be equipped with two interfaces for reading smart cards, one for communicating with the subscriber identification smart card and the other with the smart card dedicated to the other applications.

However, new developments are aimed at reducing the size of mobile telephones. One way of achieving this consists in using only one smart card, which is then of the multi-application type. Thus the mobile telephone no longer needs to have two reading interfaces.

Provision is therefore made, according to these new developments, for the same smart card to contain several application programs, one being for telephony and the other being able to be a banking application such as an electronic purse, another being able to be a loyalty application (loyalty points), a health application or a game application.

The telecommunication terminals are designed to be connected to a telecommunication network used by telephone subscribers to access other subscribers or services.

Amongst these networks are telephone networks, switched networks or integrated service networks and the cellular telephone network.

Up to the present time access to the smart card in a terminal or the smart cards in the said terminal was possible only through the terminal, from the said telecommunication network.

Provision is made, with the new developments, for this access to be open to any processing unit of the computer or microcomputer type (personal computer PC or network computer NC), referred to hereinafter as a microcomputer.

To this end the telecommunication terminal must be equipped with means of physical connection with the microcomputer. This is a case of a connector and a cable link. Some terminals are already equipped with an input/output port making it possible to connect them to a microcomputer for transferring data through the radio network.

It is therefore envisaged, according to these developments, to use the existing physical access means. However, the problem of access to the card by means other than the mobile telephone network is for all that unresolved.

SUMMARY OF THE INVENTION

The applicant has resolved this problem by providing in the terminal logical access means to the card from a microcomputer and means of managing the accesses from the telecommunication network and/or microcomputer.

The logical access means comprise means of interpreting commands sent from the microcomputer and/or sent from the network, executing these commands if it is a case of commands which can be executed by the terminal and transmitting to the card if it is a case of commands which can be executed by the card.

According to one characteristic of the invention, the management means are able:

according to a first embodiment:
  to keep the two logical access means (by microcomputer and network) active, to then change to blocking mode to momentarily block one of the means of access to the card from the microcomputer or from the network, leaving the other access open, and to put on stand-by the commands arriving through the blocked access means;

according to a second operating mode:
  to temporarily deactivate one of the access means, the terminal then functioning exclusively in smart card read mode (access through the microcomputer) or exclusively in telecommunication terminal mode (access through the network).

In fact, opening up access to the card through the terminal, other than through the telephone channel, also poses the problem of the management of the accesses in order to prevent any conflict and/or loss and/or unintentional modification of information on the card. This problem has therefore been resolved by the applicant.

Preferably the access management means keep the two access means active and put on standby the commands arriving through the network access means when the microcomputer requests access for an application different from the one which is able to be used by the network.

Preferably the access management means temporarily deactivate the network access means when the microcomputer requests access for the same application able to be used by the network.

The means of managing access to the card include means of blocking access to the card through the network and unblocking means, activated by the terminal after reception of a blocking command sent by the microcomputer to enable it to process two simultaneous accesses to the card, one access being requested by the network for one application and the other being requested by the microcomputer for a distinct application.

The means of managing access to the card also include reversible means of changing to exclusive card read mode, deactivating the telecommunication terminal operating mode, these means being activated by the terminal after reception of a read mode command.

This makes it possible to deal with the case where access is requested by the microcomputer for an application dedicated to access by the network. The terminal then functions as a smart card reader.

Advantageously the blocking means have a timeont, during which the terminal is able to receive one or more commands from the telephone network and to store this command or commands until unblocking.

Advantageously, the duration of the timeont corresponds to the maximum period required by the card for executing an application command.

BRIEF DESCRIPTION OF THE DRAWING

Reference can be made to the description below, which is given as an indication and in no way limitatively, with regard to the accompanying drawings, in which.

DETAILED DESCRIPTION

Currently, a SIM card, for example, inserted into a mobile terminal, receives commands in accordance with the standard for the mobile telephone network, for example the GSM standard.

The commands for the cards are strictly controlled by the mobile terminal. This means of access will be referred to as the GSM channel (it is a case of a logical rather than a physical channel).

Accessing the SIM card in a mobile terminal from a PC requires another means of access: this means will be referred to as the reading channel (it is case of a logical channel connected to the PC).

Simultaneous access to the SIM card by two different channels poses the problem of the sharing of a resource. For this purpose commands for blocking and unblocking access to the card are provided.

For the GSM channel to remain having priority, a timeout mechanism (or countdown) unblocks access for it.

Simultaneous access by two different applications in the same card through each of the channels is resolved by the multi-application operating system loaded in the terminal.

There are cases, and this will be detailed below, where it is advantageous to access, by means of the reading channel, the same application used by the GSM channel. As the card cannot resolve this problem, provision is made in accordance with the invention to change operating mode, the mobile terminal passing to smart card reader mode.

The terminal preferably gives priority to the GSM channel. The SIM commands of the network communication protocol (GSM) are executed within a reasonable time by the card. To do this, when the card is acted on through the reading channel, it cannot be acted on beyond a period predetermined by a timeout, possibly configurable. In practice this period corresponds to the period of execution of an application command (APDU: Application Protocol Data Unit) by the card.

In practice each application command (APDU format) sent to the card by the reading channel is framed by a Blocking Mode command and by a Unblocking Mode command.

In addition, in the cases of a multiple access, the type of command sent by the reading channel must be different from the type of command sent via the GSM channel, since the card has no means of distinguishing the origin of the commands, that is to say the commands via the reading channel or commands via the GSM channel. A sequence of commands of the same type creates a context in the card. Commands of the same type arriving by another channel could therefore modify this context unpredictably, causing a malfunction of the card, resolved solely by a reset of the card (power off/power on at the terminal).

Thus, in order to be able to execute commands arriving by the reading channel of the same type as those transmitted by the GSM channel, provision is made for changing the terminal to exclusive reading mode, as will be detailed below.

Figure 1:
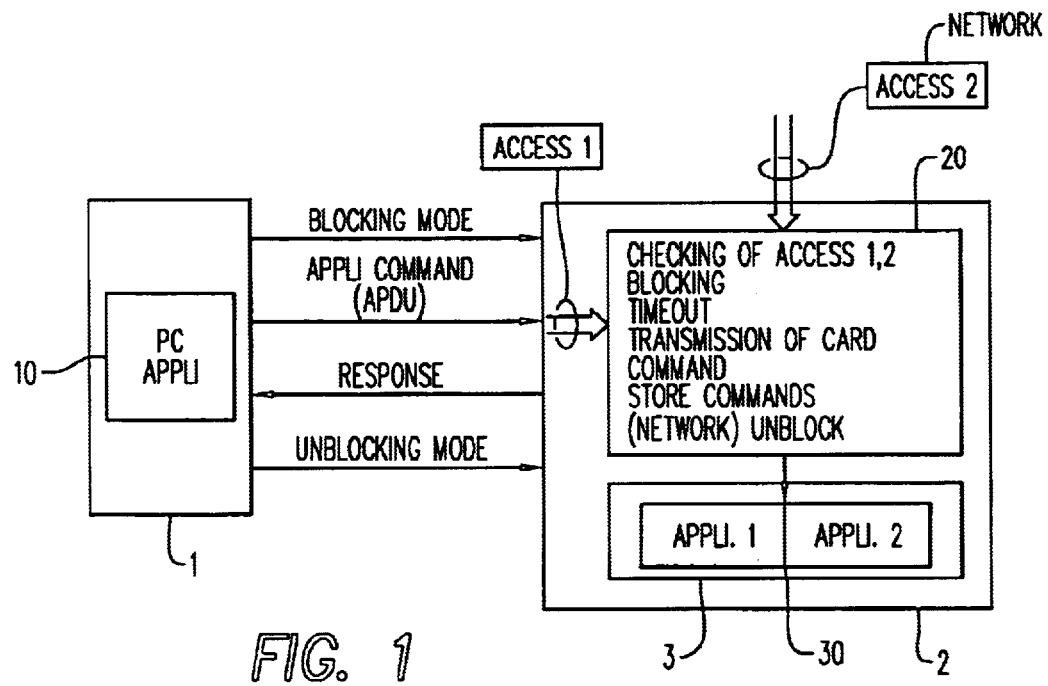
FIG. 1 illustrates schematically the functioning of the terminal in the case of two simultaneous accesses to two distinct applications.

A description will now be given of the functioning of the terminal using the diagram in FIG. 1, which corresponds to the case of multiple accesses: access I by the PC and access II by the network in order to reach two different applications, appli.1 and appli.2 respectively.

The application installed on the PC sends the Blocking Mode command, to have access to the card of the mobile terminal.

When this command is successful, the PC application sends an application command (APDU format) to the card, via the mobile, recovers the result thereof in the PC and sends the Unblocking Mode command, relating to access to the card, to the terminal.

Figure 2:
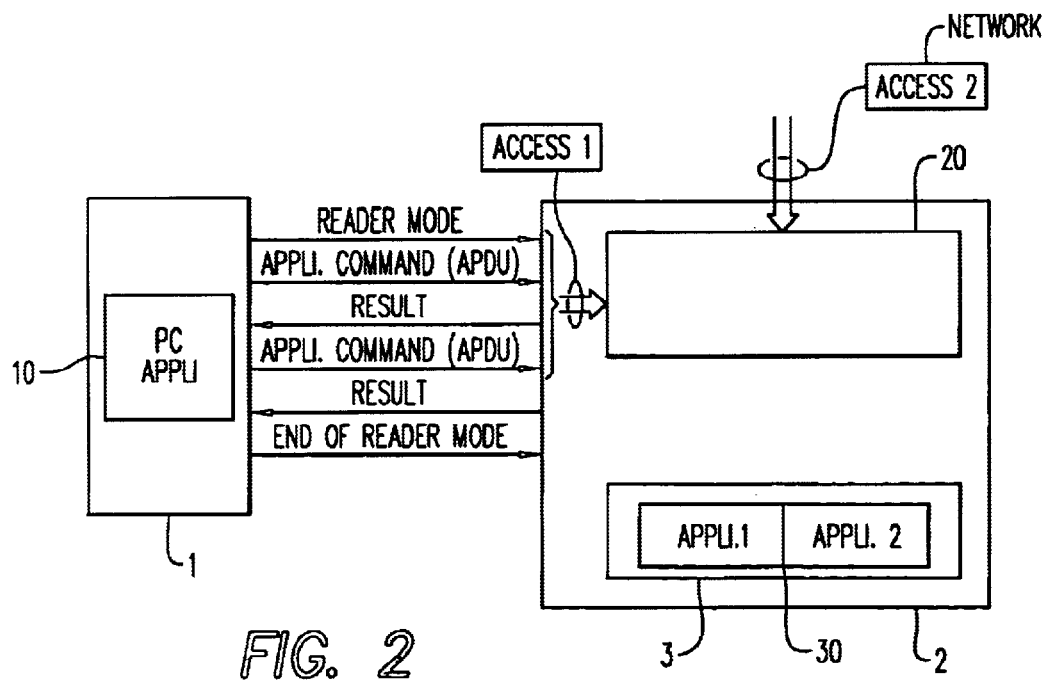
FIG. 2 illustrates schematically the functioning of the terminal in the case of the smart card reader mode.

A description will now be given of the functioning of the terminal using the diagram in FIG. 2 in the case where the PC wishes to access appli.1 (telephony) normally used by the network.

The application installed on the PC sends the Reader Mode command, in order to have exclusive access to the card of the mobile terminal and consequently deactivate the telecommunication terminal function.

When this command is successful, the PC application sends one or more application commands (APDU format) to the card, via the mobile, retrieves the result in the PC on each occasion, and then, when it has finished, the PC application sends the End of Reader Mode command to the terminal, thus reopening access by the network.

Figure 3:
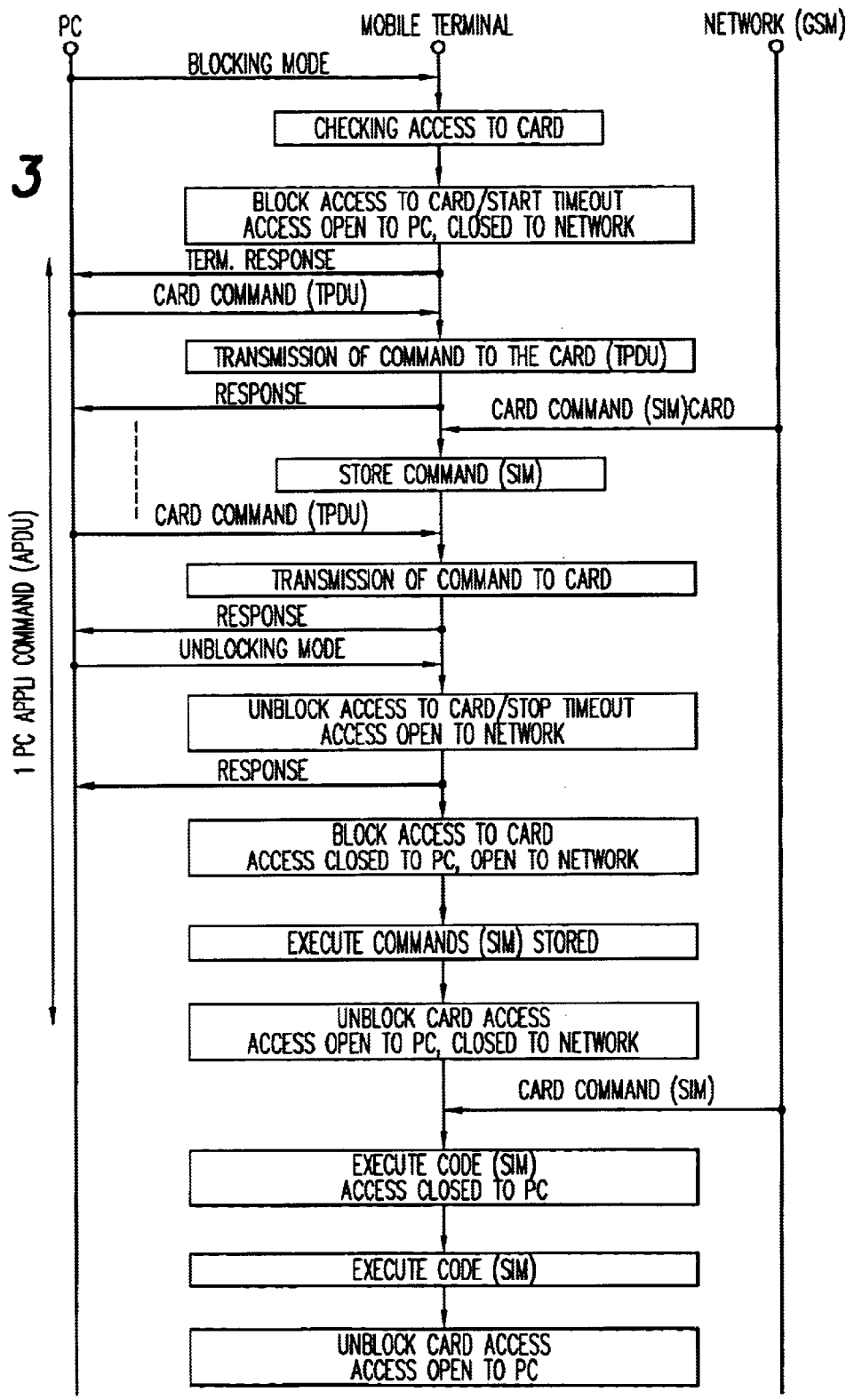
FIG. 3 illustrates the communication protocol according to the operating mode illustrated by FIG. 1

A description will now be given of the communication protocol between PC, terminal and network according to FIG. 1; this protocol is illustrated in FIG. 3.

When the application on the PC wishes to have the mobile terminal execute an APDU command (which may contain several TPDU commands), it requests of it access to the card by means of the Blocking Mode command. The terminal checks whether access is available. In this case, it places a lock limiting access only to the reading channel (that is to say it opens access to the microcomputer) and triggers a timeout at the end of which the lock will be removed automatically. The PC then sends the TPDU commands making up the APDU command, which the terminal makes the card execute. The terminal sends the responses from the card. At the end, the PC requests the terminal to release access by means of the Unblocking Mode command, and the terminal complies and ends the timeout.

If during this time the terminal has received, via the GSM channel, commands (SIM) to be executed by the card, it stores them.

When access II is once again available, the terminal blocks access only to the GSM channel, and causes the waiting commands to be executed by the card. At the end, it releases access II.

In normal mode, when the terminal receives a command via the GSM channel, it blocks access only to the GSM channel, makes the card execute the corresponding command, and then releases the access.

The maximum period of the timeout implemented by the terminal is directly related to the storage capacity for the commands received via the GSM channel. This timeout imposes a maximum period of execution of an APDU transmitted via the reading channel by the card.

Figure 4:
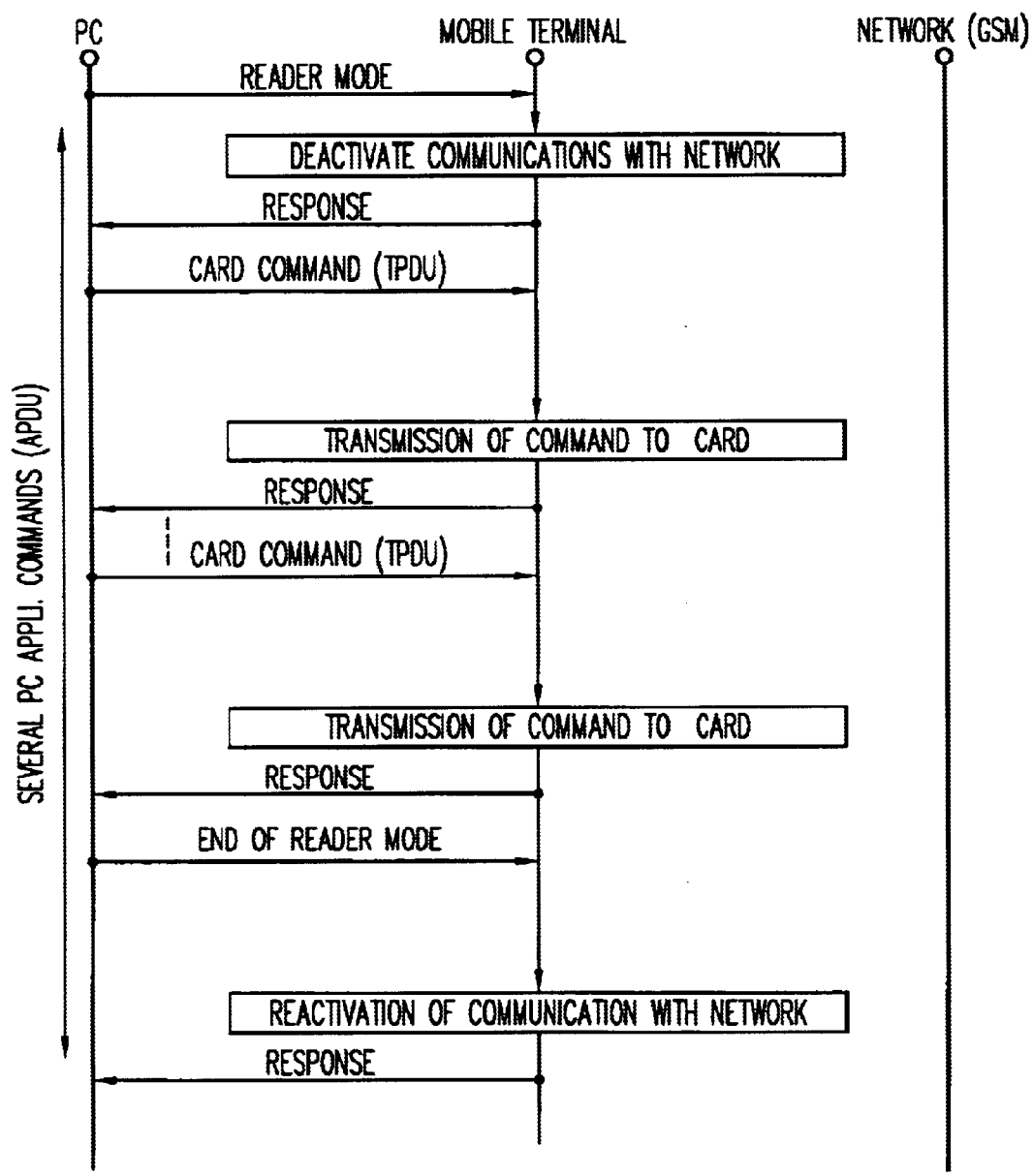
FIG. 4 illustrates the communication protocol according to the operating mode illustrated by FIG. 2.

The protocol corresponding to exclusive Reading Mode is described below and illustrated by FIG. 4.

The advantage of this mode is to enable the user to have access to the card in order particularly to send commands (to customize the card) without risk of interfering with usage by the GSM network. It is no longer necessary to remove the card from the mobile terminal to insert it in to a conventional reader: the mobile terminal becomes a reader.

The PC requests the change to exclusive reader mode by means of the Reader Mode command. The terminal deactivates all the communications with the GSM network.

The PC then uses the terminal as a normal card reader, sending TPDU commands to it. The terminal transmits the responses of the card to these commands. At the end of the operation, the PC requests the reactivation of the communications with the GSM network by means of an End of Reader Mode command.

To keep consistency with multiple access mode, each APDU command sent to the terminal could be framed by Blocking Mode and Unblocking Mode commands. These commands in the exclusive reader mode should have no effect in the terminal: the timeout would not be triggered in the terminal since the commands succeed all the time.

When the terminal is restarted, following a failure during one communication or another, a default operating mode is provided; this will preferentially be the telecommunication terminal operating mode (access from the network).

The terminal can be used for example in the case of multi-application SIM cards for, for example:

control of access to distant computers, payment (electronic purse, credit, etc), etc, point of sale terminals on GSM, ATM on GSM, etc.

customization by the subscriber of his multi-application SIM card.

Other ways of managing can be imagined such as, for example, priority GSM access, shared-time access, etc.

In the case of shared time access, provision can be made for prior storage in buffer memory respectively for each channel and authorisation of accesses, by alternate reading of each of the buffers.

What is claimed is:

1. A telecommunication terminal comprising:

a smart card providing at least one application, means of access to the card by a telecommunication network, means of access to the card from a microcomputer processing unit, and means for managing the accesses from the telecommunication network and/or the microcomputer which:

operates in a first operating mode to keep the two access means active, to change to a blocking mode to momentarily block one of the means of access to the card from the microcomputer or from the network while leaving the other access open, and to put on stand-by commands arriving through the blocked access means;

and operates in a second operating mode to temporarily deactivate one of the access means, so that the terminal functions exclusively in a smart card read mode or exclusively in a telecommunication terminal mode.

2. A telecommunication terminal according to claim 1, wherein said access means comprise means for interpreting a command sent from at least one of the microcomputer and the network, for causing the terminal to execute those commands which can be executed by the terminal and for transmitting to the card those commands which can be executed by the card.

3. A telecommunication terminal according to claim 1, wherein the access management means keeps the two access means active and puts on standby the commands arriving through the network access means when the microcomputer requests access for an application different from one which is able to be used by the network.

4. A telecommunication terminal according to claim 1 wherein the access management means temporarily deactivates the network access means when the microcomputer requests access to an application that is able to be used by the network.

5. A telecommunication terminal according to claim 1, wherein the means of managing accesses to the card include means for the logical blocking and unblocking of access to the card by the network which is activated by the terminal after reception of a blocking command sent by the microcomputer.

6. A telecommunication terminal according to claim 5, wherein the blocking means have a timeout, during which the terminal is able to receive one or more commands from the telecommunication network and to store said commands until unblocking.

7. A telecommunication terminal according to claim 6, wherein the duration of the timeout corresponds to the maximum period required by the card for executing a microcomputer application command.

8. A telecommunication terminal according to claim 1, wherein the means of managing access to the card include reversible means of changing to an exclusive card read mode in which the telecommunication terminal operating mode is deactivated, said changing means being activated by the terminal after reception of a read mode command.

9. A telecommunication terminal comprising:

a smart card providing at least one application, means of access to the card by a telecommunication network, means of access to the card from a microcomputer processing unit, and means for managing the accesses from the telecommunication network and/or the microcomputer which temporarily deactivates the network access means when the microcomputer requests access to an application that is able to be used by the network.

10. A telecommunication terminal according to claim 9, wherein said access means comprise means for interpreting a command sent from at least one of the microcomputer and the network, for causing the terminal to execute those commands which can be executed by the terminal and for transmitting to the card those commands which can be executed by the card.

11. A method for managing access to a smart card in a telecommunication terminal by each of a telecommunication network and a microcomputer processing unit, comprising the following steps:

operating in a first mode to momentarily block one of said telecommunication network and said microcomputer processing unit from access to the card, while maintaining communication with each of said telecommunication network and said microcomputer processing unit; and operating in a second alternative mode to temporarily deactivate communications with one of said telecommunication network and said microcomputer processing unit, so that the terminal functions exclusively in a smart card read mode or exclusively in a telecommunication terminal mode.

12. The method of claim 11, further including the step of storing commands in said terminal that are received from the blocked one of said telecommunication network and said microcomputer processing unit while operating in said first mode.

13. A method for managing access to a smart card in a telecommunication terminal in which each of a telecommunication network and a microcomputer can access at least one application stored on the smart card, comprising the step of temporarily deactivating access to the smart card by the telecommunication network when the microcomputer requests access to an application that is capable of being used by the network.

* * * * *